United States Patent
Sohmshetty et al.

(10) Patent No.: US 8,818,543 B2
(45) Date of Patent: Aug. 26, 2014

(54) COMPUTERIZED METHOD AND SYSTEM FOR SELECTING TECHNOLOGY USED IN VEHICLE PRODUCTION

(75) Inventors: Raj Shekar Sohmshetty, Canton, MI (US); Zhiyong Cedrick Xia, Canton, MI (US); Nicholas P. Warrick, Livonia, MI (US); Shawn Michael Morgans, Chelsea, MI (US)

(73) Assignee: Ford Motor Company, Dearborn, MI (US)

( * ) Notice: Subject to any disclaimer, the term of this patent is extended or adjusted under 35 U.S.C. 154(b) by 485 days.

(21) Appl. No.: 12/687,170

(22) Filed: Jan. 14, 2010

(65) Prior Publication Data
US 2011/0172794 A1  Jul. 14, 2011

(51) Int. Cl.
| | |
|---|---|
| G06F 19/00 | (2011.01) |
| G06Q 30/00 | (2012.01) |
| G06F 17/50 | (2006.01) |
| G06F 7/00 | (2006.01) |
| G05B 19/418 | (2006.01) |

(52) U.S. Cl.
CPC ...... *G06F 17/5095* (2013.01); *G05B 19/41805* (2013.01); *G06F 2217/08* (2013.01); *G05B 2219/31056* (2013.01)
USPC ............. 700/98; 700/103; 700/107; 700/182; 705/26.2; 705/26.5; 705/26.64; 703/1; 707/705

(58) Field of Classification Search
CPC ...................... B25J 9/1697; G05B 2219/37572
USPC ............. 700/97, 98, 103, 105, 106, 107, 182; 705/26, 27, 28, 29, 400, 0.5, 26.7, 705/27.1; 703/1; 707/705
See application file for complete search history.

(56) References Cited

U.S. PATENT DOCUMENTS

| | | | |
|---|---|---|---|
| 5,552,995 A | 9/1996 | Sebastian | |
| 5,838,965 A * | 11/1998 | Kavanagh et al. | 1/1 |
| 7,010,472 B1 * | 3/2006 | Vasey-Glandon et al. | 703/6 |
| 7,181,372 B2 * | 2/2007 | Teng et al. | 703/1 |
| 7,340,315 B2 * | 3/2008 | Ozasa et al. | 700/97 |
| 7,409,324 B2 * | 8/2008 | Yuda et al. | 703/2 |
| 7,590,937 B2 | 9/2009 | Jacobus et al. | |
| 7,603,191 B2 * | 10/2009 | Gross | 700/97 |
| 7,716,019 B2 | 5/2010 | Liu | |
| 7,769,614 B2 * | 8/2010 | Eichstaedt et al. | 705/7.11 |

(Continued)

OTHER PUBLICATIONS

"Automotive Steel Design Manual," Designing for Stamping Operations, May 1996, pp. 1-42.

*Primary Examiner* — Darrin Dunn
(74) *Attorney, Agent, or Firm* — Damian Porcari; Brooks Kushman P.C.

(57) ABSTRACT

Various embodiments may include a computerized system and method for determining a selection of technologies or processes for use in part production. A dataset of technologies or processes may be considered and standardized. Generic CAD models may be generated from the standardized dataset. Optimization metrics for each generic CAD model may be received. Data from a sourcing, a manufacturing and a design data source may also be received. An optimization algorithm may be used for each generic CAD model based on the optimization metrics and the data from the data sources. One or more optimized CAD models may be generated and one or more optimized technologies or processes for use in part manufacturing may be obtained. The optimized technologies or processes may be based on the one or more optimized CAD models. The optimized technologies or processes may be transmitted for selection and use in producing manufactured parts.

18 Claims, 4 Drawing Sheets

(56) References Cited

U.S. PATENT DOCUMENTS

| | | | |
|---|---|---|---|
| 7,908,123 B2* | 3/2011 | Maebayashi et al. | 703/1 |
| 2002/0013631 A1 | 1/2002 | Parunak et al. | |
| 2002/0052862 A1* | 5/2002 | Scott et al. | 707/1 |
| 2002/0080502 A1* | 6/2002 | Hashizume et al. | 359/831 |
| 2005/0080502 A1* | 4/2005 | Chernyak et al. | 700/97 |
| 2005/0209732 A1 | 9/2005 | Audimoolam et al. | |
| 2006/0052891 A1* | 3/2006 | Ikeda et al. | 700/97 |
| 2006/0155520 A1* | 7/2006 | O'Neill et al. | 703/11 |
| 2007/0016432 A1 | 1/2007 | Piggott et al. | |
| 2009/0204237 A1 | 8/2009 | Sustaeta et al. | |
| 2009/0249125 A1* | 10/2009 | Bhatawdekar et al. | 714/39 |
| 2011/0093105 A1* | 4/2011 | Sohmshetty et al. | 700/98 |
| 2011/0098835 A1* | 4/2011 | Yucel et al. | 700/103 |
| 2011/0172794 A1 | 7/2011 | Sohmshetty et al. | |

* cited by examiner

COMPUTERIZED METHOD AND SYSTEM FOR SELECTING TECHNOLOGY USED IN VEHICLE PRODUCTION

BACKGROUND

1. Technical Field

One or more embodiments include a system and method for selecting technology used in vehicle part or assembly production.

2. Background Art

Recently, the price for commodities such as steel has been rising sharply. Vehicle manufacturers, for example, have been particularly affected by these price changes. These increases can cause a drain on a vehicle company's finances sometimes in the hundred's of millions of dollars. Moreover, while the price of commodities is increasing, the cost of technologies for processing commodities is decreasing. For example, the cost of laser welding technologies has significantly decreased over the past few years.

Various examples exist in the prior art that attempt to provide a solution for this complexity. A thesis paper entitled "Concurrent Engineering in Manufacturing" authored by Don Anderson provides an overview and analysis of the concept of Concurrent Engineering. The paper discusses the scope of Concurrent Engineering in manufacturing through the use of examples and by describing its benefits in Computer-Integrated Manufacturing.

Another paper entitled "Design for Manufacture and Assembly on the Internet" authored by Huang, G. Q., et al. discusses the use of the Internet with respect to design for manufacture and assembly (DFMA) techniques. The paper discusses an experiment that is conducted to illustrate how a design-for-assembly technique, typically performed on a standalone workstation, can be converted into a web-based version.

SUMMARY

One aspect includes a computer-implemented method for determining a selection of technologies or processes for use in producing manufactured parts. In one or more embodiments, the method may comprise receiving a dataset of technologies or processes for consideration in determining one or more technologies or processes for use in part manufacturing. The method may further include standardizing the dataset of technologies or processes to obtain a standardized dataset of technologies or processes.

In one embodiment, the standardizing step may further comprise receiving one or more technology configuration factors and configuring the dataset of technologies based on the one or more technology configuration factors. The one or more technology configuration factors may be one or more operation strategies, one or more user inputs, or both.

The method may further include generating one or more generic computer-aided design (CAD) models from the standardized dataset of technologies or processes. The method may further include receiving one or more optimization metrics for each generic CAD model and data from at least three data sources including a sourcing data source, a manufacturing data source, and a design data source. The one or more optimization metrics may include one or more cost metrics or one or more performance metrics. The one or more performance metrics may be one or more of a part stiffness, strength, or crush capacity.

The method may further include the use of one or more optimization algorithms. The one or more optimization algorithms may be based on the one or more optimization metrics and the data from the at least three data sources. One or more optimized CAD models may be generated from the optimization algorithms.

In one embodiment, performing the algorithm may include receiving one or more constraints for each of the one or more generic CAD models. The one or more constraints may include one or more dimensions for the manufactured parts or a cost for the technology or process.

In one embodiment, the one or more optimization algorithms may be performed during a design phase of the one or more parts.

The method may further include obtaining one or more optimized technologies or processes for use in part manufacturing based on the one or more optimized CAD models. The one or more optimized CAD models may be parametric finite element models. Additionally, the method may include transmitting the one or more optimized technologies or processes for selection and use in producing manufactured parts.

In one embodiment, a report may be generated including a recommendation of one or more technologies or processes for use in part manufacturing.

In one embodiment, the one or more optimization algorithms may be one or more first optimization algorithms. In this embodiment, obtaining the one or more optimized technologies may further include, for each generic CAD model, receiving one or more materials selected by a user based on one or more recommended materials generated from one or more second optimization algorithms. The method may further include performing the one or more first optimization algorithms for each generic CAD model based on the one or more optimization metrics, the at least three data sources, and the one or more materials. Accordingly, one or more optimized CAD models may be generated.

In one embodiment, the method may be performed on a part level. In an additional embodiment, the method may be performed on an assembly level.

A second aspect includes a computer-implemented system for determining a selection of technologies or processes for use in producing manufactured parts. The system may include at least one computer. The at least one computer may be operably programmed to receive a dataset of technologies or processes for consideration in determining one or more technologies or processes for use in part manufacturing. The at least one computer may be further programmed to standardize the dataset of technologies or processes to obtain a standardized dataset of technologies or processes.

The at least one computer may be further programmed to generate one or more generic computer-aided design (CAD) models. The generic CAD models may be generated from the standardized dataset of technologies or processes.

The at least one computer may be further programmed to receive one or more optimization metrics for each generic CAD model and data from at least three data sources. The at least data sources may include a sourcing data source, a manufacturing data source, and a design data source.

The at least one computer may be further programmed to perform one or more optimization algorithms for each generic CAD model. The one or more optimization algorithms may be based on the one or more optimization metrics and the data from the at least three data sources. One or more optimized CAD models may be generated from performing the optimization algorithm(s).

In one embodiment, the at least one computer may be further programmed to determine a ranking of the one or more optimized CAD models based on the optimization algorithm.

The one or more optimized CAD models may be hierarchically ordered according to the ranking.

The at least one computer may be further programmed to obtain one or more optimized technologies or processes for use in part manufacturing based on the one or more optimized CAD models. The at least one computer may be additionally programmed to transmit the one or more optimized technologies or processes for selection and use in producing manufactured parts. The at least one computer may transmit the optimized technologies or processes over a distributed computer network.

In one embodiment, the system may further comprise the at least three data sources.

An additional aspect includes a method including receiving a technologies dataset for use in part production. The method may further include generating one or more generic CAD models of technologies based on the dataset.

In one embodiment, generating the CAD models may further include receiving one or more technology configuration factors. The method may further include configuring the generic CAD models based on the one or more technology configuration factors.

The method may further include receiving one or more metrics for each generic CAD model and data comprising at least sourcing, manufacturing, and design data.

The method may further include performing an optimization algorithm on each generic CAD model. The optimization algorithm may be based on the metrics and the sourcing, manufacturing, and design data. One or more optimized technologies may be obtained from performing the optimization algorithm.

These and other aspects of the present invention will be better understood in view of the attached drawings and following detailed description of the invention.

BRIEF DESCRIPTION OF THE DRAWINGS

The features of the present invention which are believed to be novel are set forth with particularity in the appended claims. The present invention, both as to its organization and manner of operation, together with further object and advantages thereof, may best be understood with reference to the following description, taken in connection with the accompanying drawings, in which:

DETAILED DESCRIPTION

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Various factors may contribute to challenges in designing vehicle parts such as meeting attribute requirements (such as performance and cost) while using the best manufacturing solution possible. For example, the use of laser welded blanks may be one manufacturing solution for manufacturing a particular part. The decision to use Laser Welded Blanks may depend on a number of factors. Some of these factors may include, but are not limited to, steel commodity prices, laser welding costs, product attribute requirements, logistics considerations, or commodity availability. Furthermore, the same part may also be manufactured using Tailor Rolled Blanks, Patched Welded Blanks and/or Local Reinforcements. In deciding the solution to utilize, any one or all of the factors described above may also be relevant to the decision.

To add to the complexity, different divisions with a company may have individual strategies for choosing particular technologies. For example, a purchasing division may choose a particular technology because of a relationship with the supplier or costs while manufacturing may prefer a particular technology because of the technologies performance characteristics. At times, because of the lack of standardization of technology selection between the various divisions, technology selection may become a "trial and error" process.

Another factor adding to the complexity is cost. Not surprisingly, manufacturing companies want to minimize manufacturing costs. However, employees may not always be informed of costs for particular technologies or materials. As such, deciding on a solution that meets the criteria for manufacturing a product can be inefficient, costly, onerous, and time-consuming.

Figure 1:
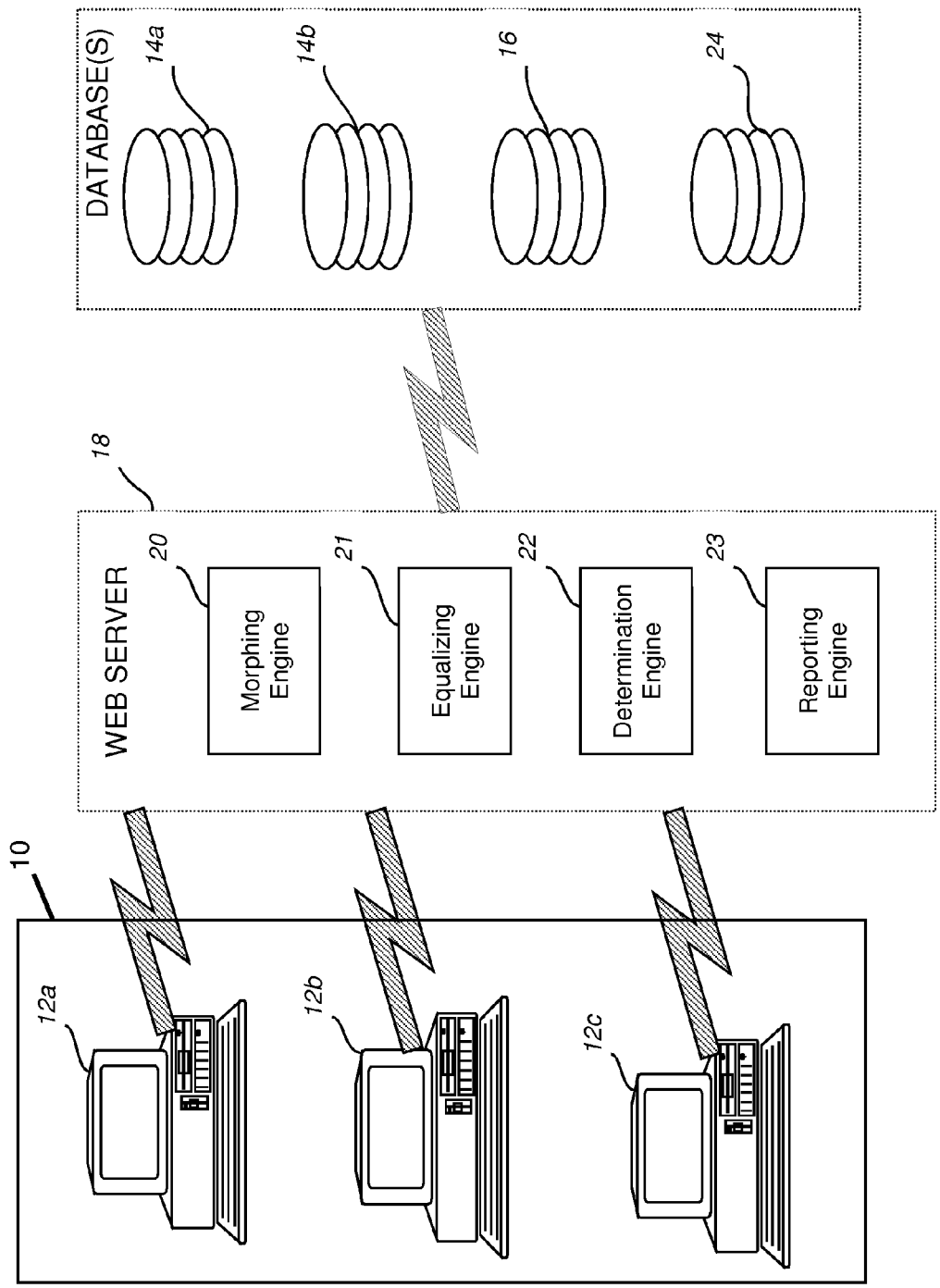
FIG. 1 shows a system for recommending technologies in a part manufacturing process according to one or more embodiments.

FIG. 1 is an exemplary illustration of a system which may be programmed to recommend one or more technologies or process for use in part manufacturing. System 10 may operate in a distributed computing network environment. The system 10 may include a number of terminals 12a, 12b, and 12c which may be used by a number of individuals associated with an original equipment manufacturer (OEM). Non-limiting examples of users may include administrators, participants and general users.

Administrators may include individuals responsible for administration of the system 10 including, but not limited to, maintenance of databases 14a, 14b and management of user access to system 10. For example, administrators may determine the authorization level of and provide authorization to one or more general users of system 10.

Participants may update and manage data in database 16. Database 16 may include data for standardization. Non-limiting examples of data may include manufacturing data, design data, sourcing data, and technology data for manufacturing one or more parts. It should be understood that the arrangement of FIG. 1 is non-limiting and various features can be modified (e.g., added to, deleted from, or combined) or rearranged without departing from the scope of the various embodiments of the invention. For example, database 16 may be one or more databases. For example, the manufacturing data may be stored in a manufacturing database, the sourcing data may be stored in a sourcing database, the design data may be stored in a design database, and the technology data may be stored in a technologies database.

Manufacturing data may include, without limitation, OEM defined performance models, performance data for particular technologies, historical performance data, and other manufacturing related information. Sourcing data may include, without limitation, cost information associated with technologies (such as cost models for determining the cost of a technology), supplier information (e.g., supplier rankings and supplier selection strategy), and other information associated with sourcing a technology. Design data may include, without limitation, vehicle program information, stamping plant information, and other design-related information. It should be understood that the arrangement of data is non-limiting and exemplary. Thus, data may be stored in more than one database or arranged in different databases without departing from the scope of the invention.

General users are end users of the system 10. For example, the general users may utilize the system 10 to determine which technology to utilize in manufacturing one or more parts.

Databases 14a may be, in one embodiment, optimization metric libraries for storing optimization metric models for one or more metrics. The metric libraries may include optimization metrics including, but not limited to, cost metrics and performance metrics which may be selected (e.g., by the general user) as inputs with regard the technology determination process. The cost metrics and performance metrics may pertain to a particular technology.

Database 14b may include one or more optimization parameter values. Optimization parameter values may include values for parameters including, but not limited to, yield strength, modulus, density, tensile strength, thickness, radius, mean radius, length, force, and cost. The parameters may pertain to the performance or cost metrics inputted by the general user. Databases 14a, 14b may be managed and maintained by administrators. In one embodiment, administrators may manage database 14a, 14b through web server 18. Furthermore, general users and participants may communicate with databases 14a, 14b and/or 16 through web server 18.

In one embodiment, the parameter values for the cost metric may be time-dependent such that the values may be different for different time periods. For example, the cost metric model may include a parameter to account for inflation such that each value in the cost model changes on a yearly basis.

A technologies database (represented herein, and throughout this application, by database 16) may include a library of technology models available for use in manufacturing one or more parts. The technology models may be stored in database 16 as computer-aided design (CAD) data. It should be understood that the term CAD refers to both computer-aided design and computer-aided engineering. Non-limiting examples of generic technology models may include laser welding, hydroforming, stamping, injection molding, and casting. Furthermore, the technology models may be arranged according to a commodity (i.e., assembly) or part that can be manufactured with the one or more technology models. Thus, one or more technologies may be associated with each part or commodity. Non-limiting examples of vehicle commodities may include vehicle seats, rocker reinforcements, instrument panels, door systems and body pillar subsystems.

As an example, the following non-limiting technologies may be designated as suitable for producing a rocker reinforcement: cold stamping AHSS, rollforming UHSS, tailor rolled blanks, laser welded blanks and patch welded blanks. The suitability of particular technologies for producing one or more commodities or parts may be determined by the OEM based on historical information and current trends in the industry. Other sources of information may also be available for determining a technology's suitability. Furthermore, the data comprising the dataset of technologies may be dynamic such that the information in the database is updated (e.g., by the administrator).

In one embodiment, data in the technology library may be filtered by a filtering engine (not shown). The filter engine may standardize the technology data in order to, for example, generate a set of technologies available to the user for consideration in a manufacturing process. The filter engine may filter data according to one or more filter strategies defined by, for example, the OEM.

A legacy technology selection database 24 may be in communication with the web server 18. Data in database 24 may include, but is not limited to, the deviations log, rationales for a user selecting particular recommended technologies, and historical rankings of technologies. In one embodiment, the information in database 24 may assist an OEM in determining the adequacy of using historically selected technologies with current vehicle programs and/or analyzing the ranking change of one or more technologies over time.

One or more engines 20, 21, 22, 23 may process the dataset of technologies by standardizing the data and generating a list of one or more optimized technologies for use in part production. The list may include recommended technologies. It should be understood that engines 20, 21, 22, and 23 may be arranged as one module, combined sets of modules or as individual modules consistent with the practice in the art. For purposes of illustration and clarity, however, engines 20, 21, 22, and 23 are depicted as separate modules.

Morphing engine 20 may use the generic CAD models in database 16 to generate one or more technologies configured—or "morphed"—according to one or more configuration factors. The configured models may be configured for one or more parts. Configuration factors may be user inputs and/or OEM-defined inputs (e.g., and without limitation, operation strategies). Non-limiting examples of user input configuration factors may include vehicle part information and vehicle program information (e.g., the vehicle type and the year of the vehicle). To input the user-defined configuration factors, the user may receive on terminal 12c a GUI-based display having one or more fields or prompts for input.

OEM-defined configuration factors may include, but are not limited to, technology selection strategies and/or commodity selection strategies. A non-limiting example of a commodity selection strategy includes using an aluminum or magnesium intensive design for lift gates for premium vehicles. OEMs may define operation strategies in order to enforce or comply with particular operation objectives and goals. The operation strategies may be dynamic strategies such that the strategies change according to, for example, industry trends, business strategy, etc. In one embodiment, the operation strategies may be programmed to the software as business rules that can be dynamically updated.

Equalizing engine 21 may further process the configured models by optimizing the models according to one or more optimization metrics. A non-limiting example of an optimization metric is a performance metric relating to the technology. Non-limiting examples of performance metrics may include dent resistance, bending strength, torsion stiffness, bending stiffness, and tensile strength. Engine may also receive one or more configuration factors. Engine 21 may generate one or more technologies optimized according to the optimization metric and one or more of the configuration factors.

In one embodiment, the performance metric models may include the performance metrics as functions of one or more of the performance parameters. For example, one non-limiting performance metric for a part may be torsion stiffness as a function of a particular modulus and thickness value. Another non-limiting performance metric may be bending strength as a function of yield strength and geometry. It should be understood that the performance metric can be a function of one or a plurality of performance parameters.

Determination engine 22 may include one or more algorithms for further optimizing the one or more technologies.

The determination may be based on additional optimization metrics and configuration factors. A non-limiting example of an optimizing metric used by the determination engine 22 may include cost. The determination engine 21 may generate one or more parameterized finite element (PFE) models. These PFE models may or may not be further optimized.

As with performance metrics, cost models may include cost metrics as functions of one or more cost parameters. The cost metric models may define how the cost value of one or more technologies may be determined as part of recommending one or more technologies to the general user. An exemplary, non-limiting cost model may be as follows:

$$\text{laser welding cost} = \text{length of weld} \times \text{cost/inch of laser welding}$$

Both the performance models and the cost models may be dynamic models that change based on different variables (e.g., and without limitation, industry standards).

Reporting engine 23 may process the generated data for reporting. The report may include a list of technologies for use in part production and the relative cost for each technology. A non-limiting example of a report that may be generated by the reporting engine 23 is provided in FIG. 4.

In one embodiment, the reporting engine 23 may recommend one or more technologies. The recommendation may be a prioritized or ranked set of technologies based on one or more optimization metrics. Further details of the optimization process and the ranking process will be described below.

Terminal 12c may include a graphical user interface (GUI) for displaying information to the end user. Terminal 12c may communicate with server 18 over a wireless network (e.g., the Internet, LAN, WAN, GAN, or Intranet) as in, for example, a client-server relationship. In one embodiment, information displayed to the general user may be through one or more web pages accessed via a web browser (e.g., INTERNET EXPLORER manufactured and distributed by The Microsoft Corporation).

Figure 2:
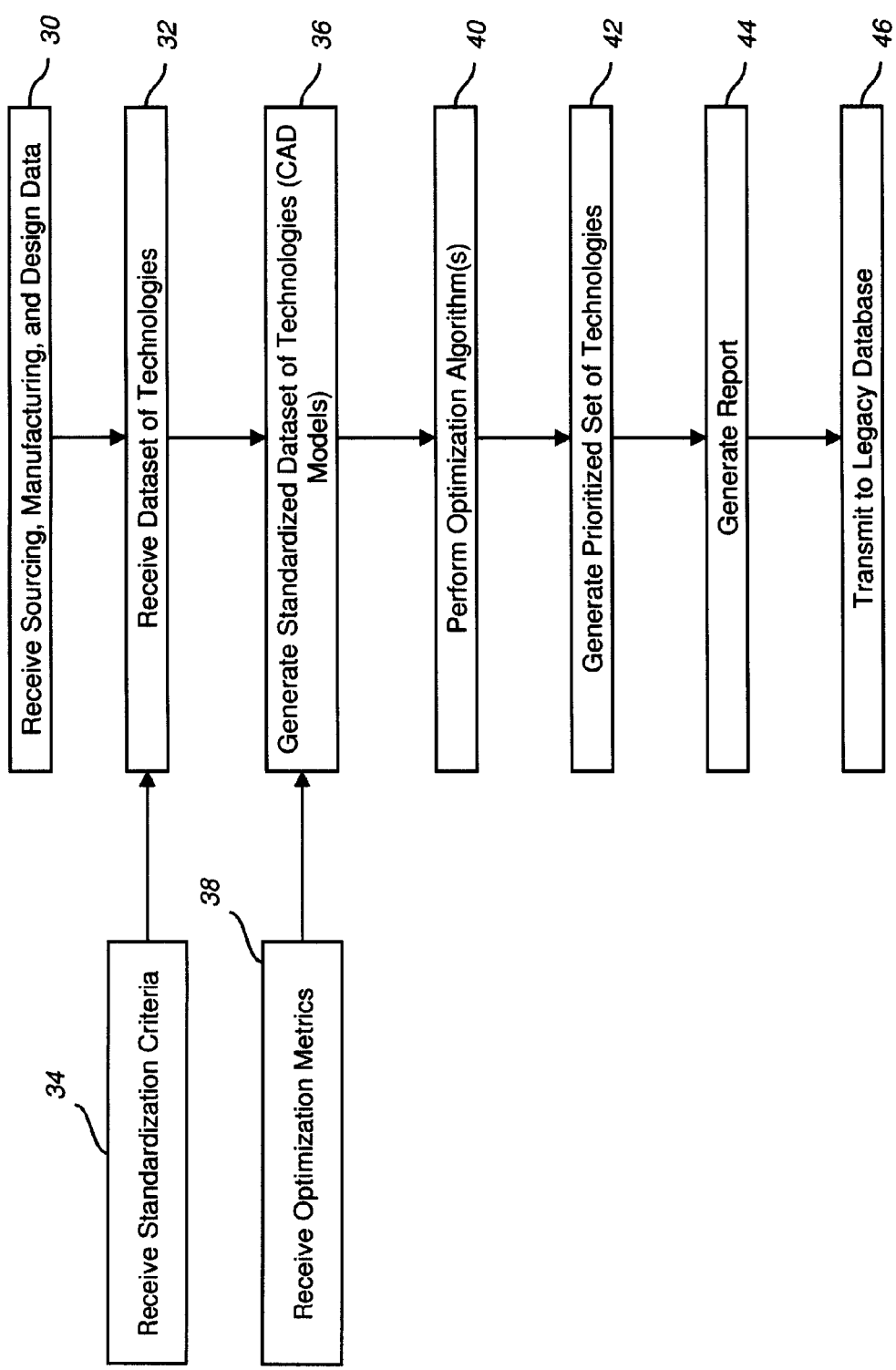
FIG. 2 shows the operation of determining one or more technologies for selection for use in part manufacturing.

The technology selection process for use in designing and manufacturing one or more parts may include multiple aspects. FIG. 2 provides an exemplary illustration of the process for determining a selection of technologies for use in part production.

The general user from terminal 12c may activate the program for selecting the one or more technologies. Activation may be accomplished either from terminal 12c or via the selection of an icon on the GUI display of 12c which generates a connection to web server 18 and activates the software program.

The technology selection process may include the synthesis of data received from various sources. For instance, as illustrated in block 30, manufacturing data, sourcing data, and design data may be used in selecting a technology or process. This data may be received and stored in, for example, non-volatile memory of web server 18. Additionally or alternatively, the data may be stored in one or more databases (e.g., database 16).

As illustrated in block 32, the dataset of technologies may be loaded (and temporarily stored in volatile memory) upon activation of the software. Alternatively or additionally, the software may receive the data from a database storing the dataset of technologies (e.g., database 16).

As illustrated in block 34, standardization criteria may be received for standardizing the dataset of technologies. Standardizing the dataset of technologies may narrow the data of technologies to generate a dataset of technologies for consideration in selecting one or more technologies or processes used in part manufacturing. The standardization criteria may be based on user inputs or operation strategies defined by an OEM. A general user may input the one or more standardization criteria using a web-based interface.

Upon receiving the standardization criteria, the dataset of technologies may be standardized as illustrated in block 36. The standardized collection of data may include the one or more configured (or "morphed") CAD models for a particular vehicle part.

As illustrated in block 38, the user may input the one or more optimization metrics.

As illustrated in block 40, one or more optimization algorithms may be performed on the standardized collection of technologies generated from step 36 (described above). The algorithm(s) may be performed based on the inputs and criteria described above. The optimization algorithms may optimize the technology models and determine one or more technologies or processes that are suitable for producing one or more vehicle parts. As a result of the optimization algorithm(s) performed on the standardized collection of technologies, the one or more PFE models may be generated.

In one embodiment, the optimization algorithm may also be based on one or more constraints defined or predetermined by the OEM. Constraints may also be input by a user. In a further embodiment, one or more optimization metrics may also be a constraint. For example, and without limitation, cost (which may be an optimization metric) may also be a constraint used in selecting technologies.

In one embodiment, where the cost is predefined, cost may be pre-negotiated with suppliers and, therefore, may not be alterable by the general user. In other embodiments, the user may input a cost range for a technology (which may or may not be based on cost strategies defined by the OEM).

As another non-limiting example, the one or more part constraints may be information pertaining to the part being manufactured using the selected technology. For example, the part information may include the part's size, weight, and dimensions. This information may or may not be input by a general user.

Figure 4:
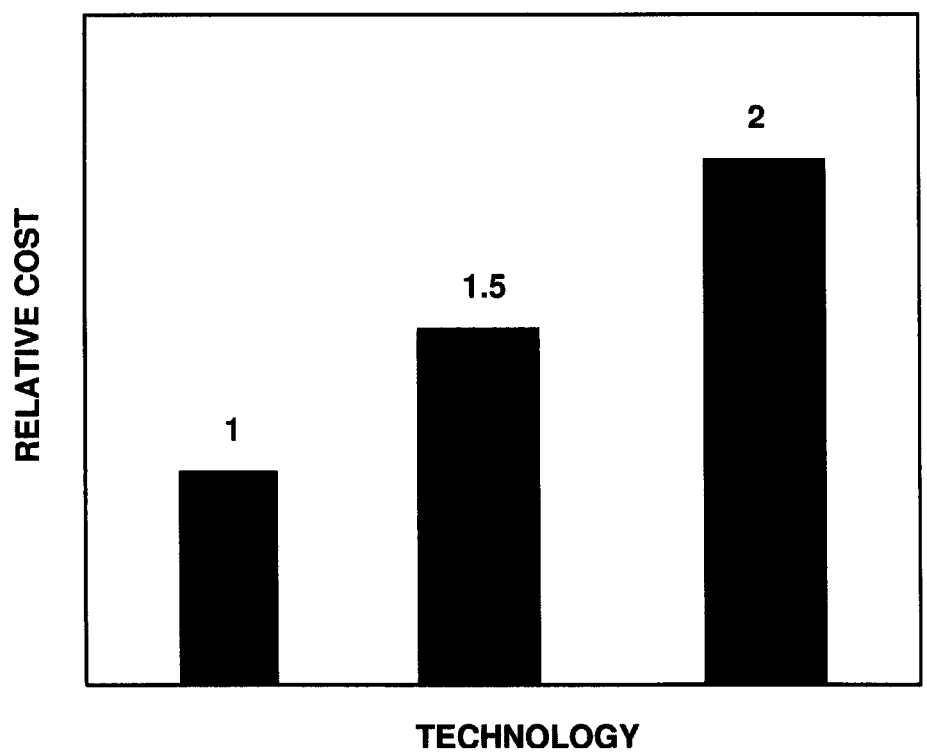
FIG. 4 shows an illustrative output of the technology reporting process according to one or more embodiments.

As illustrated in block 42, a prioritized set of technologies for use in part manufacturing may be generated. It The prioritized set may be textual or graphical (e.g., as illustrated in FIG. 4). The prioritized set may be basted on the PFE models generated in block 40. As illustrated in block 44, a report may be generated including the prioritized set of technologies.

In one embodiment, the report may include recommendations on technologies to use in part manufacturing. The recommendation may further include a rank of the technologies according to, for example, one or more metrics inputted by the general user. For example, the technologies may be ranked according to those that provide the best cost savings.

As illustrated in block 46, the results of the technology selection process may be transmitted to the legacy database 24.

Figure 3:
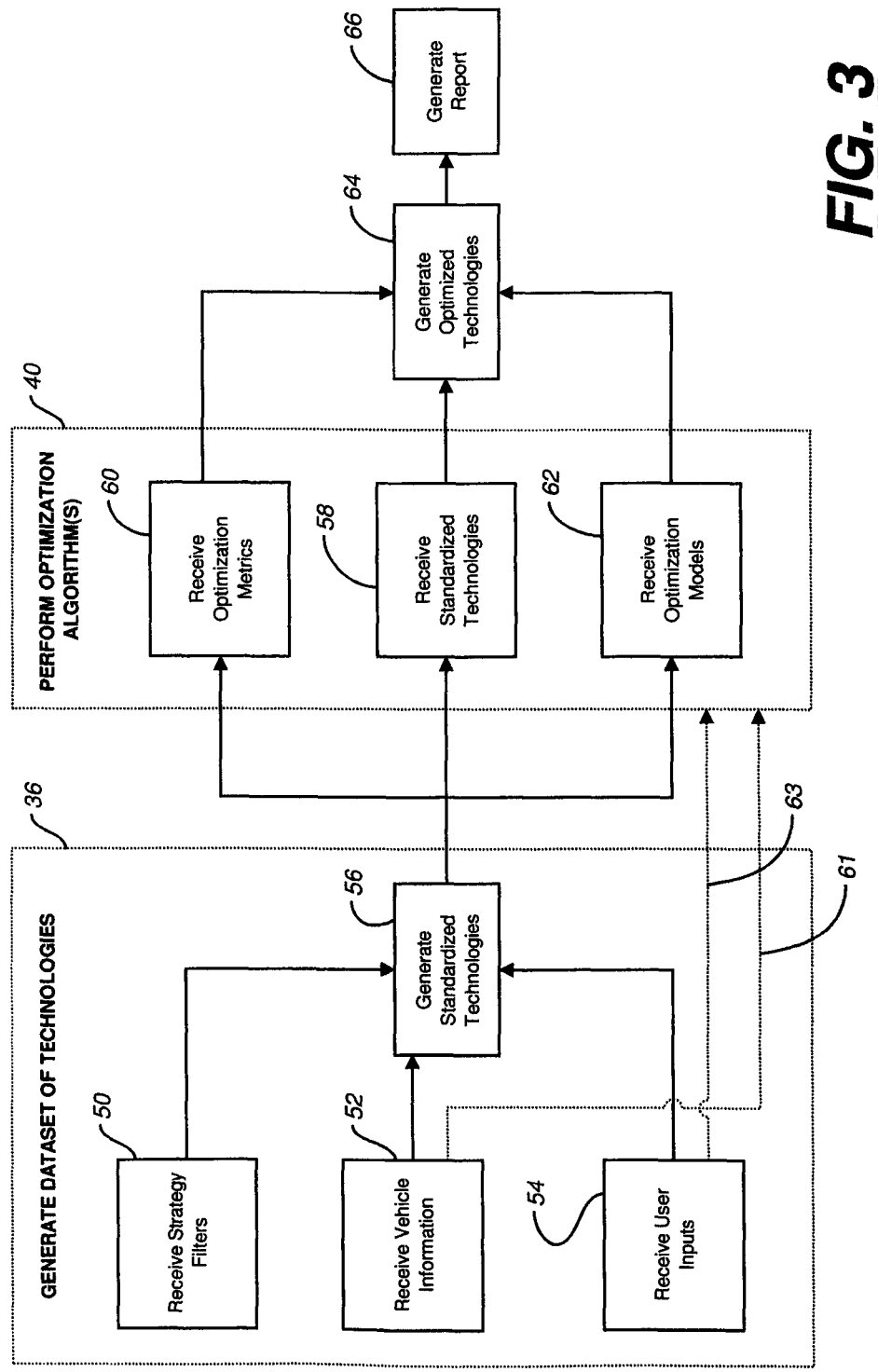
FIG. 3 shows the standardization and optimization process of one or more technologies according to one of the various embodiments.

FIG. 3 further illustrates the process of standardizing the dataset of technologies (block 36 of FIG. 2) and performing the optimization algorithm (block 40 of FIG. 2). As illustrated in block 56, a standardized dataset of technologies may be generated based on one or more strategy filters (block 50), vehicle information (block 52) and/or one or more user inputs (block 54).

One or more optimization algorithms may then be performed on the standardized dataset of technologies (block 58). The optimization algorithms may be based on the one or more optimization metrics (block 60) and one or more optimization models of the optimization metrics (block 62). As illustrated by data flows 61 and 63, vehicle information and the one or more user inputs may also be used as inputs in performing the optimization algorithm(s).

The one or more optimized technologies may be generated as illustrated in block 64. A report may be generated with the optimized technologies (i.e., PFE models) as illustrated in block 66. The general user may the view the report to select a technology for use in part production.

The report may be used, for example, to determine which technologies are the least expensive compared to other technologies for manufacturing one or more parts. This information may assist in determining which technologies are preferred in manufacturing one or more parts (where cost is the preference factor). In one embodiment, the costs associated with each part may be hidden from a general user based on the access level assigned to the general user by the administrator. This may be to comply with, for example, confidentiality agreements with suppliers. FIG. 4 illustrates an example of this report.

In one embodiment, the technologies displayed to a user may be based on supplier-dependent data. For example, certain technologies may be specific to particular suppliers. Thus, technologies associated with specific suppliers may be reported. In some instances, however, the information for a particular supplier may be limited or missing (e.g., there may be no cost for the technology provided by the specific supplier). In such instances, generic information (e.g., cost information) for the technology may be shown. The generic information may be provided by, for example, the OEM.

In one embodiment, system 10 may be utilized in a distributed network computing environment. In such an environment, the technology selection system and process may be one aspect or component of a larger computing system or operation used in vehicle part production. For example, the technology selection process may include communicating with a material recommendation system used for recommending one or more materials with which to produce a part. System 10 may receive data representing materials recommended for manufacturing one or more parts. The data may be utilized as an additional standardization criteria, performance metric or constraint for determining one or more technologies or processes for selection and use in part manufacturing.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A computer-implemented method for determining a selection of technologies or processes for use in producing manufactured parts, the method comprising:
   receiving a request to generate a list of one or more technologies or processes for manufacturing a vehicle part;
   filtering a dataset of technologies or processes based on processes and cost suitable for producing the vehicle part;
   generating one or more generic computer-aided design (CAD) models for the vehicle part from the filtered dataset of technologies or processes;
   receiving one or more optimization metrics, a standardization criteria, and data from at least three data sources including a sourcing data source, a manufacturing data source, and a design data source;
   performing one or more optimization algorithms for the one or more generic CAD models based on the one or more optimization metrics, the standardization criteria, and the data from the at least three data sources to generate one or more optimized CAD models for the vehicle part such that the one or more optimization algorithms generate a prioritized set of one or more optimized technologies for the one or more optimized CAD models;
   ranking the one or more optimized technologies or processes for use in part manufacturing based on the one or more optimized CAD models; and
   transmitting the one or more optimized technologies or processes in the list of one or more technologies or processes for selection and use in producing the vehicle part.

2. The computer-implemented method of claim 1 wherein the standardizing step further comprises:
   receiving one or more technology configuration factors; and
   configuring the dataset of technologies based on the one or more technology configuration factors.

3. The computer-implemented method of claim 2 wherein the one or more technology configuration factors are one or more operation strategies, one or more user inputs, or both.

4. The computer-implemented method of claim 1 wherein the one or more optimization metrics include one or more cost metrics.

5. The computer-implemented method of claim 1 wherein the one or more optimization metrics include one or more performance metrics.

6. The computer-implemented method of claim 5 wherein the one or more performance metrics include at least one of a part stiffness, strength, and crush capacity.

7. The computer-implemented method of claim 1 wherein the performing step further comprises receiving one or more constraints for each of the one or more generic CAD models.

8. The computer-implemented method of claim 7 wherein the one or more constraints is selected from the group consisting of one or more dimensions for the vehicle part or a cost for the technology or process.

9. The computer-implemented method of claim 1 wherein the transmitting step further comprises generating a report including a recommendation of one or more technologies or processes for use in part manufacturing.

10. The computer-implemented method of claim 1 wherein the one or more optimization algorithms are one or more first optimization algorithms and the obtaining step further comprises:
   for each generic CAD model, receiving one or more materials selected by a user based on one or more recommended materials generated from one or more second optimization algorithms; and
   performing the one or more first optimization algorithms for each generic CAD model based on the one or more optimization metrics, the at least three data sources, and the one or more materials to generate one or more optimized CAD models.

11. The computer-implemented method of claim 1 wherein the one or more optimized CAD models are parametric finite element models for one or more technologies or processes.

12. The computer-implemented method of claim 1 wherein the method is performed on a part level.

13. The computer-implemented method of claim 1 wherein the method is performed on an assembly level.

14. The computer-implemented method of claim 1 wherein performing the one or more optimization algorithms occurs during a design phase of the one or more parts.

15. A computer-implemented system for determining a selection of technologies or processes for use in producing manufactured parts, the system comprising:
  at least one computer operably programmed to:
  receive a dataset of technologies or processes;
  standardize filtering a dataset of technologies or processes to filter the data to sort out
    processes and technologies suitable for producing one or more vehicle parts;
  generate one or more generic computer-aided design (CAD) models from the filtered dataset of technologies or processes;
  receive one or more optimization metrics, a standardization criteria, and data from at least three data sources including a sourcing data source, a manufacturing data source, and a design data source;
  perform one or more optimization algorithms for the one or more CAD models based on the one or more optimization metrics, the standardization criteria, and the data from the at least three data sources to generate one or more optimized CAD models for the vehicle part such that the one or more optimization algorithms generate a prioritized set of one or more optimized technologies for the one or more optimized CAD models;
  rank the one or more optimized technologies or processes for use in part manufacturing based on the one or more optimized CAD models; and
  transmit the one or more optimized technologies or processes for selection and use in producing manufactured parts.

16. The computer-implemented system of claim 15 further comprising the at least three data sources stored in non-volatile memory in a server or a database with access by general users and participants that may update and manage variables within the data sources.

17. The computer-implemented system of claim 15 wherein the at least one computer operably programmed to generate the one or more optimized CAD models is further programmed to:
  determine a ranking of the one or more optimized CAD models based on the optimization algorithm; and
  hierarchically order the one or more optimized CAD models according to the ranking.

18. The computer-implemented system of claim 15 wherein the at least one computer is further programmed to transmit the optimized technologies or processes over a distributed computer network.

* * * * *